United States Patent [19]

Arnot

[11] 4,149,312

[45] Apr. 17, 1979

[54] PIPE CUTTER

[76] Inventor: Alfred R. E. Arnot, The Bell House, Baughurst, Basingstoke, Hampshire, England

[21] Appl. No.: 681,842

[22] Filed: Apr. 30, 1976

[30] Foreign Application Priority Data

May 3, 1975 [GB] United Kingdom ............... 18637/75

[51] Int. Cl.[2] ............................................. B23D 21/06
[52] U.S. Cl. ........................................... 30/98; 30/99
[58] Field of Search ....................................... 30/99, 98

[56] References Cited

U.S. PATENT DOCUMENTS 3,252,218   5/1966   Braun ...................................... 30/98
3,651,569   3/1972   Arnot ...................................... 30/95

Primary Examiner—James L. Jones, Jr.
Attorney, Agent, or Firm—Jacobi, Lilling & Siegel

[57] ABSTRACT

A pipe cutter for cutting installed pipes comprises a frame which can be fitted round the pipe and which carries a cutting tool and pipe engaging rollers; a feeding mechanism in the frame derives a drive from rotation of the frame around the pipe to feed the cutting tool into the pipe; a two-part ring is fitted around the pipe; and a one-way drive mechanism is provided between the ring and the frame, so that as the ring is reciprocated by means of a handle the frame is rotated to feed the cutting tool and so cut the pipe.

7 Claims, 3 Drawing Figures

PIPE CUTTER

BACKGROUND OF THE INVENTION

In my prior U.S. Pat. No. 3,651,569 there is described a pipe cutting device which is power-driven or manually operated by rotating a handle around the pipe to be cut. This prior device has proved to be highly successful in cutting pipes having accessible ends, for example in building construction. In building maintenance work, however, it is often necessary to cut a pipe which is already installed and which may be located in a rather inaccessible position close to a wall and/or floor. It is an object of the present invention to provide a pipe cutter which can readily be used in such situations.

SUMMARY OF THE INVENTION

In accordance with the present invention there is provided a pipe cutter comprising a frame which is arranged to be fitted round the pipe to be cut and which has a first part arranged to carry a cutting tool and a second part which carries at least one pipe-engaging member, said parts being relatively movable, a feeding mechanism which derives a drive from rotation of the frame around the pipe to feed said tool inwardly, an annular member formed in at least two parts and arranged to be fitted around the pipe to be cut, and a one-way drive mechanism between said frame and said annular member, whereby reciprocal movement of said annular member drives said frame around the pipe to feed the cutting tool and so cut the pipe.

Preferably, said pipe-engaging member comprises a roller which receives a rotary drive from the pipe when the pipe cutter is rotated, and said feeding mechanism is driven by the roller to feed said cutting tool inwardly.

Preferably also, said annular member comprises a two-part ring formed internally with ratchet teeth, and a spring-loaded pawl is carried by said frame to engage said teeth.

DESCRIPTION OF A PREFERRED EMBODIMENT

Figure 1:
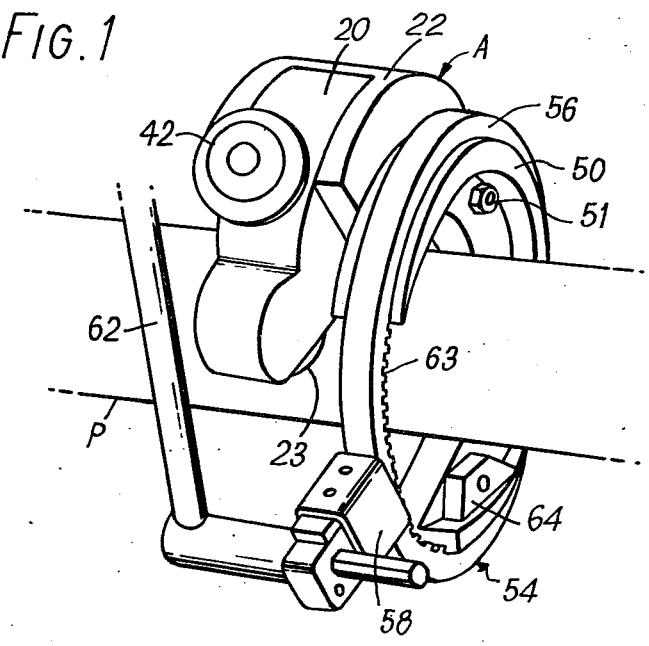
FIG. 1 is a perspective view showing a pipe cutter according to the present invention applied to a pipe to be cut.

Referring to the drawings, the pipe cutter comprises a cutter device A which is substantially as described in my U.S. Pat. No. 3,651,569, the teachings of which are incorporated herein by reference. The device A has a two-part frame of which part 20 is pivotally mounted on the base part 22. Part 20 carries a thin freely-rotatable cutter wheel 23.

Two rollers 25, 26 are rotatably mounted on the part 22 of the frame, and these rollers serve to support and position the device on pipe P. Roller 26 is knurled to receive a frictional drive from the pipe P as the device revolves around the pipe. The roller 26 is formed with an eccentric and operates to feed cutter wheel 23 as described in my earlier patent.

Figure 3:
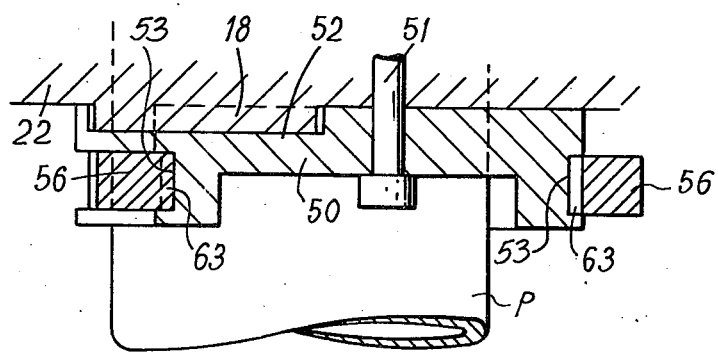
Figure 2:
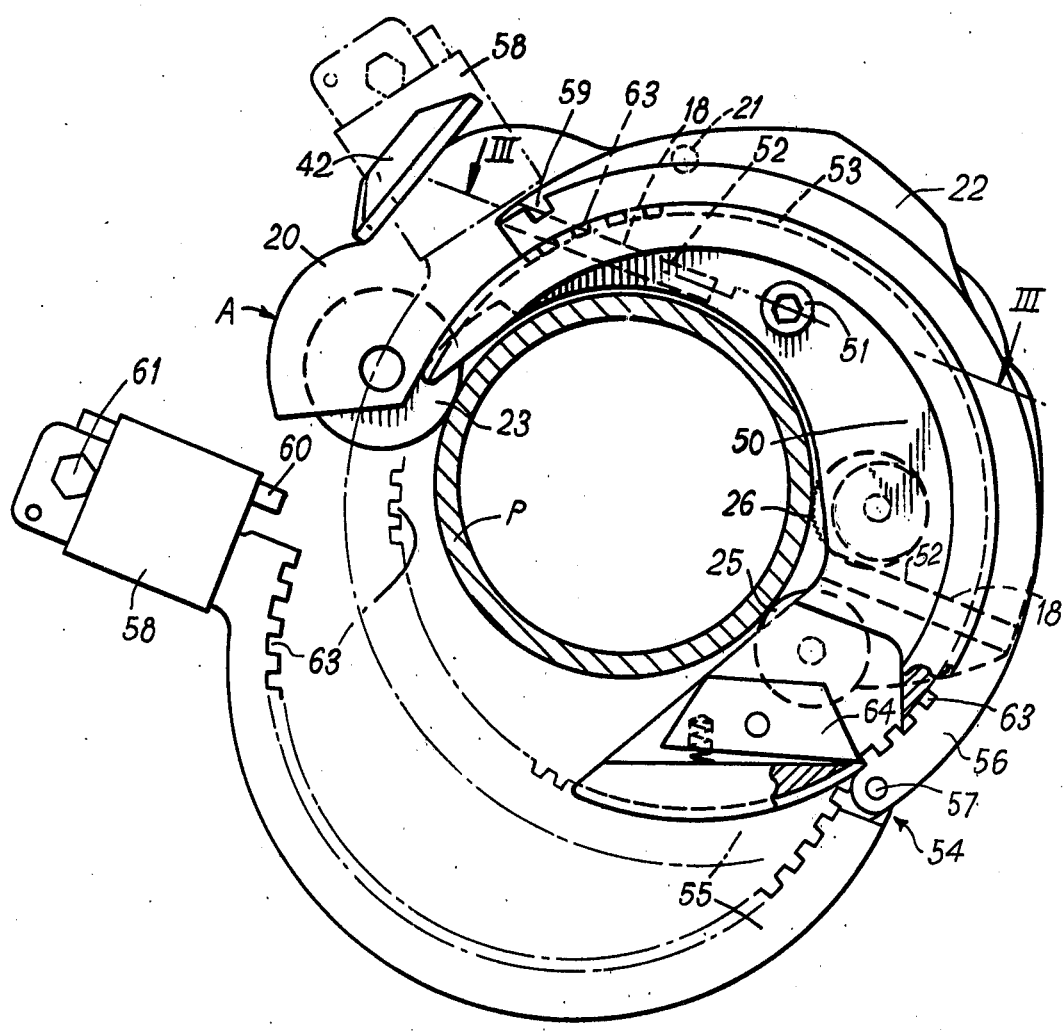
FIG. 2 is an end view corresponding to FIG. 1 but showing the pipe cutter being applied to the pipe; and, FIG. 3 is a section on the line III—III of FIG. 2.

According to the present invention, a C-shaped bearing plate 50 is secured to the base part 22 of the cutter frame by a screw 51, and the plate is formed with grooves 52 which are received by the parallel driving tongues 18 on the frame part 22. The plate 50 is also formed with a recess 53 (FIGS. 2 and 3) to receive a two-part ring 54 which comprises two semi-circular sections 55 and 56 hinged together at 57. Section 55 carries a clasp device 58 at its free end, and section 56 is formed with an end recess 59 to receive tongue 60 of the device 58. The free end of ring section 55 is also formed with a hexagonal opening 61 to receive the end of a handle 62. The clasp device 58, which carries the tongue 60, is slidable along the free end of section 55 (radially outwardly from the position shown in the drawings) when the handle 62 is not inserted into the opening.

The sections of ring 54 are formed with internal ratchet teeth 63, and a spring-loaded pawl 64 is carried by the bearing plate 50 to engage these teeth.

In use of the pipe cutter according to the invention, the cutter device A with the bearing plate 50 attached, is positioned over pipe P; the mouth of the C-shaped plate 50 is sufficiently large to receive the pipe P and, as an example, the device may be suitable for cutting pipes having outside diameters of up to 2 inches. The cutter wheel 23 is then brought into engagement with the pipe by turning the adjustment screw head 42. With the device in position, the ring 54 is fed round the pipe, as indicated in full lines in FIG. 2, and closed to enter recess 53. The ends of the ring are then locked together by the clasp device 58, as indicated in broken lines, and the end of handle 62 is inserted into opening 61 to hold the clasp in the locking position.

Reciprocation of the handle 62 through the angle available, reciprocates the toothed ring 54 to act through the pawl 64 to rotate the cutter device A in series of steps round the pipe P. As the device moves round the pipe, the roller 26 is rotated to feed the cutter wheel 23 inwardly until the pipe is severed, as disclosed in U.S. Pat No. 3,651,569.

For use with welded pipes, the wheel cutter may be replaced by a V-groove cutting tool to provide an appropriate welding chamfer.

I claim:

1. An adjustable pipe cutter comprising a frame which is adapted to be fitted round and rotated on the pipe to be cut and which comprises first and second parts movable relative to one another, said first part carrying a cutting tool, at least one pipe-engaging member carried by said second part, a feeding mechanism to feed said tool inwardly in response to rotation of the frame around the pipe, a bearing carried on one of said parts of the frame, an annular member adapted to be fitted around the pipe to be cut and which comprises at least two parts and is rotatably mounted on said bearing independently of the other of said frame parts, and a one-way drive mechanism between said frame and said annular member, so that oscillatory movement of said annular member drives said frame round the pipe to feed the cutting tool and so cut the pipe.

2. A pipe cutter as claimed in claim 1, in which said pipe-engaging member comprises a roller which receives a rotary drive from the pipe when the pipe cutter is rotated, and said feeding mechanism is driven by the roller to feed said cutting tool inwardly.

3. A pipe cutter according to claim 1, in which said annular member comprises a two-part ring, ratchet teeth are formed internally on said ring, and a spring-loaded pawl is carried by said frame to engage said teeth.

4. A pipe cutter according to claim 3, in which a recessed member is carried alongside said frame, and said ring is received by said recessed member.

5. A pipe cutter according to claim 3 and further comprising a handle adapted to be attached to said annular member to effect reciprocal movement of said annular member.

6. A pipe cutter according to claim 5, in which the parts of said ring are hinged together at their one ends, and a clasp device is provided to secure the other ends of the rings together, said handle being adapted to lock the clasp device in its closed position.

7. A pipe cutter according to claim 1, in which said cutting tool comprises a rotary cutting wheel.

* * * * *